United States Patent
Hen et al.

(10) Patent No.: US 12,373,757 B2
(45) Date of Patent: Jul. 29, 2025

(54) USING WEIGHTED PEER GROUPS TO SELECTIVELY TRIGGER A SECURITY ALERT

(71) Applicant: Microsoft Technology Licensing, LLC, Redmond, WA (US)

(72) Inventors: Idan Hen, Tel Aviv (IL); Itay Argoety, Tel Aviv (IL); Dror Cohen, Tel Aviv (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/197,480

(22) Filed: Mar. 10, 2021

(65) Prior Publication Data
US 2022/0292417 A1 Sep. 15, 2022

(51) Int. Cl.
*G06Q 10/0635* (2023.01)

(52) U.S. Cl.
CPC .................. *G06Q 10/0635* (2013.01)

(58) Field of Classification Search
CPC .................. G06Q 10/105; G06Q 10/0635
See application file for complete search history.

(56) References Cited

U.S. PATENT DOCUMENTS

| | | | |
|---|---|---|---|
| 9,288,202 B1 | 3/2016 | Felton et al. | |
| 10,609,218 B1 | 3/2020 | Moller et al. | |
| 10,887,325 B1 | 1/2021 | Lin et al. | |
| 11,295,241 B1* | 4/2022 | Badawy | G06N 5/022 |
| 2014/0380484 A1* | 12/2014 | Choi | G06F 21/552 726/25 |
| 2015/0101053 A1* | 4/2015 | Sipple | H04L 63/1425 726/24 |
| 2015/0200953 A1 | 7/2015 | Vidhun | |
| 2015/0373043 A1 | 12/2015 | Wang et al. | |
| 2017/0193514 A1 | 7/2017 | Chen | |
| 2017/0324760 A1* | 11/2017 | Gorny | H04L 63/1433 |

(Continued)

FOREIGN PATENT DOCUMENTS

| | | |
|---|---|---|
| CN | 101442433 A | 5/2009 |
| CN | 106104563 A | 11/2016 |
| WO | 2019220363 A1 | 11/2019 |

OTHER PUBLICATIONS

Peer Group Analysis in Identity and Access Management to Identify Anomalies; Dhamdhere et al; 2017 (Year: 2017).*

(Continued)

*Primary Examiner* — Deirdre D Hatcher
(74) *Attorney, Agent, or Firm* — Wade IP Law PLLC (57) ABSTRACT

Techniques are described herein that are capable of using weighted peer groups to selectively trigger a security alert. A determination is made that an entity performs an operation. The entity has peers that are categorized among peer groups. For each peer group, an extent to which the peers in the peer group perform the operation is determined. Weights are assigned to the respective peer groups. For each peer group, the extent to which the peers in the peer group perform the operation and the weight that is assigned to the peer group are combined to provide a respective weighted group value. A risk score, which is based at least in part on the weighted group values of the peer groups, is assigned to the operation. The security alert regarding the operation is selectively triggered based at least in part on the risk score.

20 Claims, 5 Drawing Sheets

(56) References Cited

U.S. PATENT DOCUMENTS

| | | | |
|---|---|---|---|
| 2018/0027006 A1 | 1/2018 | Zimmermann et al. | |
| 2018/0082192 A1 | 3/2018 | Cormier et al. | |
| 2018/0131661 A1 | 5/2018 | He et al. | |
| 2018/0139227 A1* | 5/2018 | Martin | H04L 63/1433 |
| 2018/0241764 A1* | 8/2018 | Nadolski | H04L 63/20 |
| 2018/0329977 A1* | 11/2018 | Soceanu | G06F 21/6227 |
| 2020/0045064 A1 | 2/2020 | Bindal et al. | |
| 2020/0053111 A1* | 2/2020 | Jakobsson | H04L 63/1416 |
| 2021/0073828 A1 | 3/2021 | Dutta et al. | |
| 2021/0142209 A1* | 5/2021 | Patil | G06N 5/04 |
| 2021/0157907 A1 | 5/2021 | Argoety et al. | |
| 2021/0216928 A1* | 7/2021 | O'Toole | G06F 16/287 |
| 2021/0266323 A1* | 8/2021 | Jani | G06Q 10/063112 |
| 2022/0075788 A1* | 3/2022 | Kalou | G06F 16/9035 |
| 2022/0086162 A1* | 3/2022 | Badawy | G06N 20/00 |
| 2022/0200800 A1* | 6/2022 | Xu | G06F 21/6245 |
| 2022/0277402 A1 | 9/2022 | Keda et al. | |
| 2022/0329612 A1* | 10/2022 | Verma | H04L 63/1425 |

OTHER PUBLICATIONS

"Non Final Office Action Issued in U.S. Appl. No. 16/692,545", Mailed Date: Apr. 8, 2022, 13 Pages.

"Final Office Action Issued in U.S. Appl. No. 16/692,545", Mailed Date: Dec. 8, 2021, 10 Pages.

"Non Final Office Action Issued in U.S. Appl. No. 16/692,545", Mailed Date: Aug. 2, 2021, 10 Pages.

"International Search Report and Written Opinion Issued in PCT Application No. PCT/US2020/057267", Mailed Date: Dec. 23, 2020, 11 Pages.

Das, et al., "Modeling User Communities for Identifying Security Risks in an Organization", In the Proceedings of IEEE International Conference on Big Data, Dec. 11, 2017, pp. 4481-4486.

Li, et al., "Generating Interpretable Network Asset Clusters For Security Analytics", In Proceedings of IEEE International Conference on Big Data, Dec. 10, 2018, pp. 2972-2979.

Lin, et al., "BEAM: An Anomaly-Based Threat Detection System for Enterprise Multi-Domain Data", In Proceedings of IEEE International Conference on Big Data, Dec. 10, 2020, pp. 2610-2618.

"International Search Report and Written Opinion Issued in PCT Application No. PCT/US22/018588", Mailed Date: Jun. 24, 2022, 14 Pages.

"Final Office Action Issued in U.S. Appl. No. 16/692,545", Mailed Date: Oct. 14, 2022, 13 Pages.

"Non-Final Office Action Issued in U.S. Appl. No. 16/692,545", Mailed Date: Apr. 7, 2023, 13 Pages.

First Office Action received on Chinese Application No. 202080092286.4 mailed on Feb. 20, 2024, 10 pages (English Translation Provided).

Notice of Allowance mailed on Dec. 6, 2023, in U.S. Appl. No. 16/692,545, 5 Pages.

Communication under Rule 71(3) Received in European Patent Application No. 22711410.5, mailed on Jul. 18, 2024, 08 pages.

Communication 94(3) Received for European Application No. 20811788.7, mailed on Apr. 4, 2024, 5 pages.

Decision to Grant pursuant to Article 97(1) received in European Application No. 22711410.5, mailed Nov. 21, 2024, 2 pages.

"Notice of Allowance Issued in U.S. Appl. No. 16/692,545", Mailed Date: Aug. 29, 2023, 5 Pages.

Notice of Allowance received on Chinese Application No. 202080092286.4 mailed on Jan. 1, 13, 2025, 08 pages (English Translation Provided).

First Examination Report Received for Indian Application No. 202217026866, mailed on Mar. 22, 2025, 06 pages.

* cited by examiner

FIG. 5 ated, the time consumed to review the false positives inhibits (e.g., prevents) the security analyst from identifying an actual threat to the security of the system.

USING WEIGHTED PEER GROUPS TO SELECTIVELY TRIGGER A SECURITY ALERT

BACKGROUND

User and entity behavior analytics (UEBA) is a cybersecurity technique to detect anomalous behavior of one or more entities in a system. Accordingly, UEBA techniques typically are able to detect security threats from within the system. For instance, UEBA may be used to identify patterns of behavior of entities in the system and to further identify anomalies from those patterns. Such an anomaly may indicate a potential threat against security of the system.

Conventional UEBA techniques often enable detection of malicious or abusive behavior that would go undetected by other types of security monitoring systems, such as those that focus on external threats to the system. However, conventional security monitoring systems, including those that utilize UEBA techniques, often provide a relatively high number of false positives. A false positive occurs when an anomaly is identified as a security threat to the system, though the anomaly is not a security threat to the system.

Having to review a substantial number of false positives may cause a security analyst to experience alert fatigue such that the time consumed to review the false positives inhibits (e.g., prevents) the security analyst from identifying an actual threat to the security of the system.

SUMMARY

Various approaches are described herein for, among other things, using weighted peer groups to selectively trigger a security alert. A peer of an entity is another entity that has a relationship with the entity. Examples of an entity include but are not limited to a user, a device (e.g., a server), an application, and data (e.g., a file). For instance, an entity may be anything with an Internet protocol (IP) address. A relationship between a peer and an entity is characterized by the peer and the entity having one or more attributes in common. The peers of an entity may be categorized among peer groups. Each peer group includes a subset of the peers, and the peers in each subset have a respective type of relationship with the entity.

Example types of a relationship include but are not limited to organizational, security, collaboration, and behavioral. An organizational relationship between an entity and a peer is a relationship in which the entity and the peer are employed by a same organization, are included in a same department or division of an organization, and/or have a same title, manager, or role in an organization. A security relationship between an entity and a peer is a relationship in which the entity and the peer have one or more security permissions in common. A collaboration relationship between an entity and a peer is a relationship in which the entity and the peer share a resource (e.g., collaborate by using the resource). Examples of a resource include but are not limited to a file, a folder, and a message. Examples of a message include but are not limited to an electronic mail (email) message, a text message, a short message service (SMS) message, an audio message, and a video message (e.g., via a business communication platform, such as the Microsoft Teams® platform which is developed and distributed by Microsoft Corporation or the Slack® platform which is developed and distributed by Slack Technologies, Inc.). A behavioral relationship between an entity and a peer is a relationship in which the entity and the peer perform one or more same activities.

A weighted peer group is a peer group to which a weight is assigned (e.g., applied). For example, the weight that is assigned to a peer group may indicate a relative importance or relevance of information regarding the peer group as to whether the security alert is to be triggered.

In an example approach of using weighted peer groups to selectively trigger a security alert, a determination is made that an entity performs an operation. The entity has peers that are categorized among peer groups. For each peer group, an extent to which the peers in the peer group perform the operation is determined. Weights are assigned to the respective peer groups. For each peer group, the extent to which the peers in the peer group perform the operation and the weight that is assigned to the peer group are combined to provide a respective weighted group value. A risk score, which is based at least in part on the weighted group values of the peer groups, is assigned to the operation. The security alert regarding the operation is selectively triggered based at least in part on the risk score.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of using weighted peer groups to selectively trigger a security alert. A peer of an entity is another entity that has a relationship with the entity. Examples of an entity include but are not limited to a user, a device (e.g., a server), an application, and data (e.g., a file). For instance, an entity may be anything with an Internet protocol (IP) address. A relationship between a peer and an entity is characterized by the peer and the entity having one or more attributes in common. The peers of an entity may be categorized among peer groups. Each peer group includes a subset of the peers, and the peers in each subset have a respective type of relationship with the entity.

Example types of a relationship include but are not limited to organizational, security, collaboration, and behavioral. An organizational relationship between an entity and a peer is a relationship in which the entity and the peer are employed by a same organization, are included in a same department or division of an organization, and/or have a same title, manager, or role in an organization. A security relationship between an entity and a peer is a relationship in which the entity and the peer have one or more security permissions in common. A collaboration relationship between an entity and a peer is a relationship in which the entity and the peer share a resource (e.g., collaborate by using the resource). Examples of a resource include but are not limited to a file, a folder, and a message. Examples of a message include but are not limited to an electronic mail (email) message, a text message, a short message service (SMS) message, an audio message, and a video message (e.g., via a business communication platform, such as the Microsoft Teams® platform which is developed and distributed by Microsoft Corporation or the Slack® platform which is developed and distributed by Slack Technologies, Inc.). A behavioral relationship between an entity and a peer is a relationship in which the entity and the peer perform one or more same activities.

A weighted peer group is a peer group to which a weight is assigned (e.g., applied). For example, the weight that is assigned to a peer group may indicate a relative importance or relevance of information regarding the peer group as to whether the security alert is to be triggered.

Example techniques described herein have a variety of benefits as compared to conventional techniques for monitoring security of a system. For instance, the example techniques may be capable of providing a more robust and/or accurate assessment as to whether an operation of an entity is an anomaly or is a security threat to the system, as compared to conventional security monitoring techniques. Accordingly, the example techniques may reduce a likelihood of a false positive (i.e., an anomaly that is inaccurately identified as a security threat to the system) and/or increase a likelihood of a true positive identification of a security threat. The example techniques may be capable of identifying peer groups of an entity dynamically as attributes of the entity and/or the peers change over time. The example techniques may be capable of resolving conflicting assessments regarding multiple peer groups as to whether an operation is an anomaly or is a security threat. By taking into consideration assessments regarding multiple peer groups, the example techniques may reduce a number of gaps (e.g., blind spots) in the overall assessment. An entity with relatively fewer peer groups may be scrutinized less that an entity with relatively more peer groups, and relatively smaller peer groups may trigger security alerts more often than relatively larger peer groups. The example techniques may compensate for such disparities by taking the number and/or size of peer groups into consideration to determine whether a security alert is to be triggered by an operation.

By using weighted peer groups to selectively trigger a security alert regarding an operation in accordance with any one or more of the example techniques described herein, security of a system in which the operation was performed may be increased. For example, triggering the security alert (as a result of identifying the operation as a security threat) may cause remedial actions to be performed to mitigate negative effects of the operation or to prevent an entity that performed the operation from performing another such operation. In accordance with this example, the entity may be inhibited (e.g., prevented) from accessing resources (e.g., files, folders, accounts) in the system. In another example, not triggering the security alert (as a result of identifying the operation as not being a security threat) may enable resources of the system to be allocated to other tasks.

The example techniques may reduce an amount of time and/or resources (e.g., processor cycles, memory, network bandwidth) that is consumed to monitor security of a system (e.g., to detect anomalies and/or to determine whether such anomalies constitute security threats to the system). For instance, by more accurately and/or more precisely detecting anomalies and determining whether such anomalies constitute security threats, the time and resources associated with determining whether a detection of a security threat is a false positive may be mitigated (e.g., avoided). For example, it may be unnecessary to perform operations to confirm that a detection of a security threat is accurate. The example techniques may thereby reduce a cost associated with detecting a security threat, for example, by not incurring a cost that is attributable to determining whether the detection of the security threat is a false positive. The example techniques may increase efficiency of a computing system that monitors security of a system that includes the computing system, for example, by increasing accuracy and/or precision of detecting security threats to the system. For instance, by increasing the accuracy and/or precision, the example techniques may eliminate a need for the computing system to perform remedial operations with regard to non-threatening anomalies that would have otherwise been identified as security threats.

The example techniques may improve (e.g., increase) a user experience and/or increase efficiency of a security analyst who monitors security of a system, for example, by more accurately and/or precisely detecting security threats to the system. For instance, by more accurately and/or precisely detecting security threats, an amount of the security analyst's time that would have been consumed to confirm legitimacy of identified security threats and/or to attempt to remediate non-threatening anomalies that are identified as security threats may be reduced (e.g., eliminated).

The example techniques may be capable of selectively performing a remedial operation (e.g., triggering a security alert) with regard to the operation depending on whether the operation is detected to be a security threat.

Figure 1:
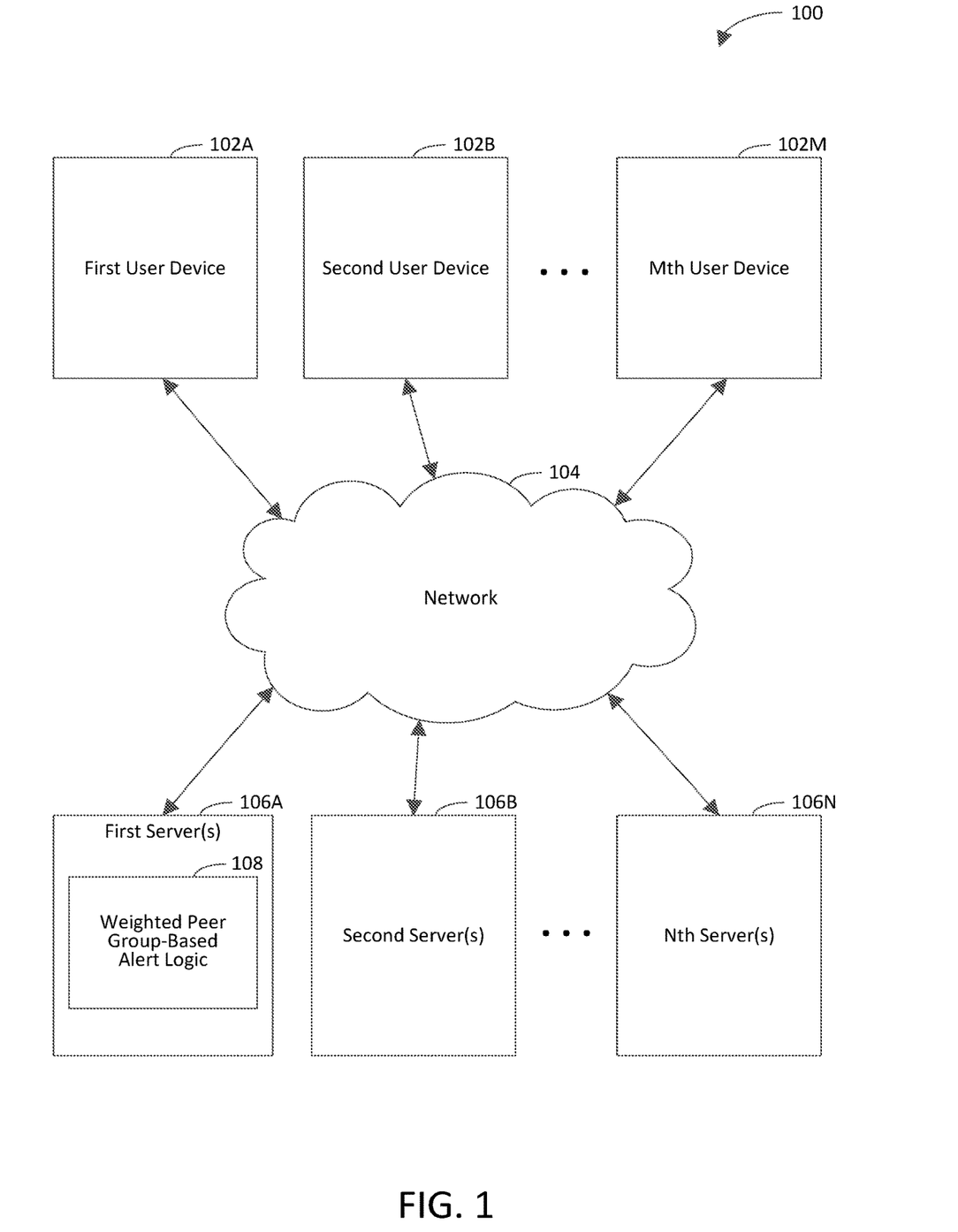
FIG. 1 is a block diagram of an example weighted peer group-based alert system in accordance with an embodiment.

FIG. 1 is a block diagram of an example weighted peer group-based alert system 100 in accordance with an embodiment. Generally speaking, the weighted peer group-based alert system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the weighted peer group-based alert system 100 uses weighted peer groups to selectively trigger a security alert. Detail regarding techniques for using weighted peer groups to selectively trigger a security alert is provided in the following discussion.

As shown in FIG. 1, the weighted peer group-based alert system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are processing systems that are capable of communicating with the user devices 102A-102M. The servers 106A-106N are configured to execute computer programs that provide information to users in response to receiving requests from the users. For example, the information may include documents (Web pages, images, audio files, video files, etc.), output of executables, or any other suitable type of information. Any one or more of the computer programs may be a cloud computing service. A cloud computing service is a service that executes at least in part in the cloud. The cloud may be a remote cloud, an on-premises cloud, or a hybrid cloud. It will be recognized that an on-premises cloud may use remote cloud services. Examples of a cloud computing service include but are not limited to Azure® developed and distributed by Microsoft Corporation, Google Cloud® developed and distributed by Google Inc., Oracle Cloud® developed and distributed by Oracle Corporation, Amazon Web Services® developed and distributed by Amazon.com, Inc., Salesforce® developed and distributed by Salesforce.com, Inc., and Rackspace® developed and distributed by Rackspace US, Inc. In accordance with some example embodiments, the servers 106A-106N are configured to host respective Web sites, so that the Web sites are accessible to users of the weighted peer group-based alert system 100.

The first server(s) 106A are shown to include weighted peer group-based alert logic 108 for illustrative purposes. The weighted peer group-based alert logic 108 is configured to use weighted peer groups to selectively trigger a security alert. In an example implementation, the weighted peer group-based alert logic 108 determines that an entity performs an operation. The entity has peers that are categorized among peer groups. Each peer of the entity has a relationship with the entity. Each peer group includes a respective subset of the peers. The peers in each subset have a respective type of relationship with the entity. For each peer group, the weighted peer group-based alert logic 108 determines an extent to which the peers in the peer group perform the operation. The weighted peer group-based alert logic 108 assigns weights to the respective peer groups. Each weight indicates an extent to which attributes of the entity correspond to attributes of the peers in the respective peer group. For each peer group, the weighted peer group-based alert logic 108 combines the extent to which the peers in the peer group perform the operation and the weight that is assigned to the peer group to provide a respective weighted group value. The weighted peer group-based alert logic 108 assigns a risk score, which is based at least in part on the weighted group values of the peer groups, to the operation. The weighted peer group-based alert logic 108 selectively triggers the security alert regarding the operation based at least in part on the risk score.

The weighted peer group-based alert logic 108 may be implemented in various ways to use weighted peer groups to selectively trigger a security alert, including being implemented in hardware, software, firmware, or any combination thereof. For example, the weighted peer group-based alert logic 108 may be implemented as computer program code configured to be executed in one or more processors. In another example, at least a portion of the weighted peer group-based alert logic 108 may be implemented as hardware logic/electrical circuitry. For instance, at least a portion of the weighted peer group-based alert logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

The weighted peer group-based alert logic 108 is shown to be incorporated in the first server(s) 106A for illustrative purposes and is not intended to be limiting. It will be recognized that the weighted peer group-based alert logic 108 (or any portion(s) thereof) may be incorporated in any one or more of the user devices 102A-102M. For example, client-side aspects of the weighted peer group-based alert logic 108 may be incorporated in one or more of the user devices 102A-102M, and server-side aspects of weighted peer group-based alert logic 108 may be incorporated in the first server(s) 106A. In another example, the weighted peer group-based alert logic 108 may be distributed among the user devices 102A-102M. In yet another example, the weighted peer group-based alert logic 108 may be incorporated in a single one of the user devices 102A-102M. In another example, the weighted peer group-based alert logic 108 may be distributed among the server(s) 106A-106N. In still another example, the weighted peer group-based alert logic 108 may be incorporated in a single one of the servers 106A-106N.

Figure 2:
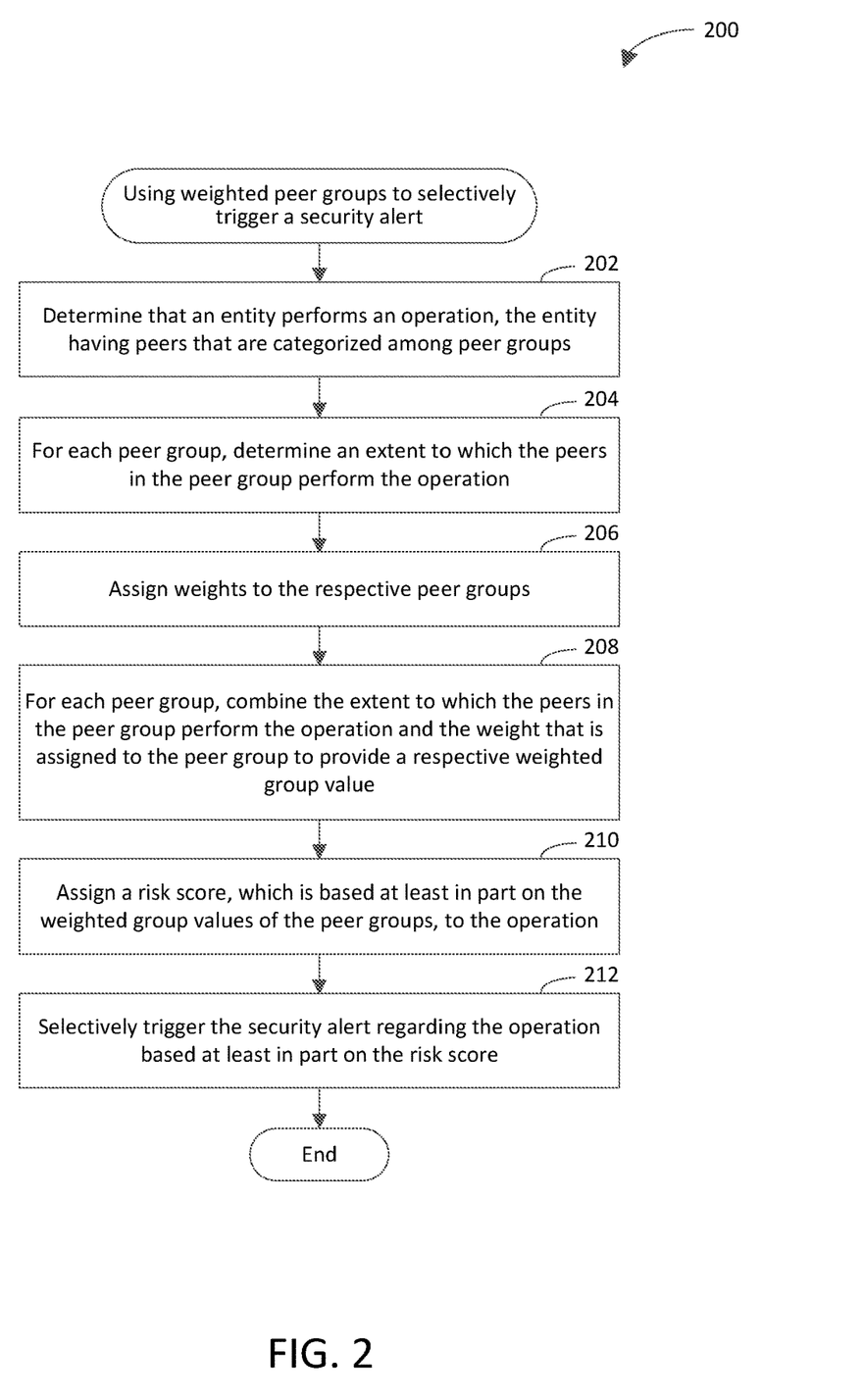
FIGS. 2-3 depict flowcharts of example methods for using weighted peer groups to selectively trigger a security alert in accordance with embodiments.
Figure 3:
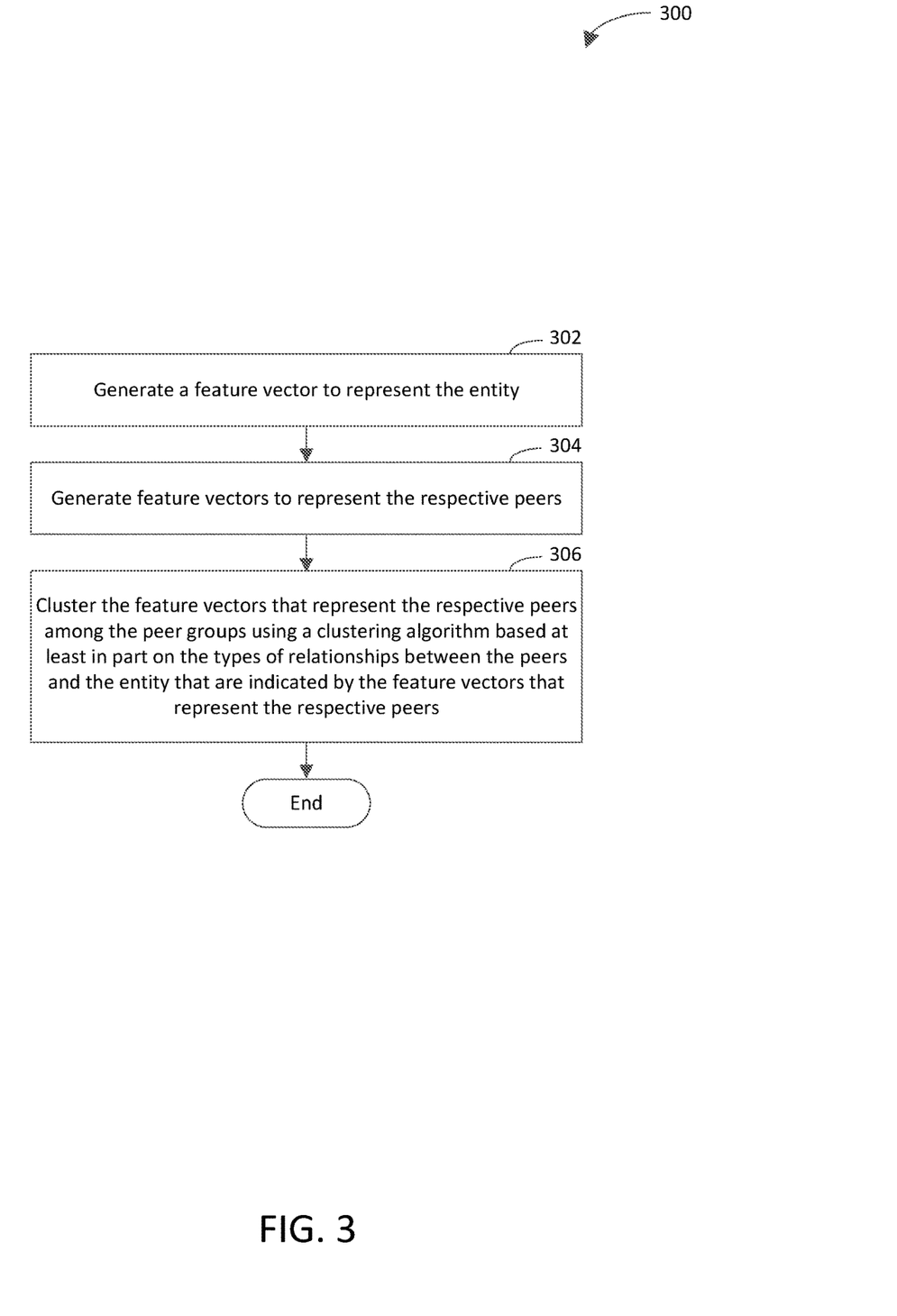
Figure 4:
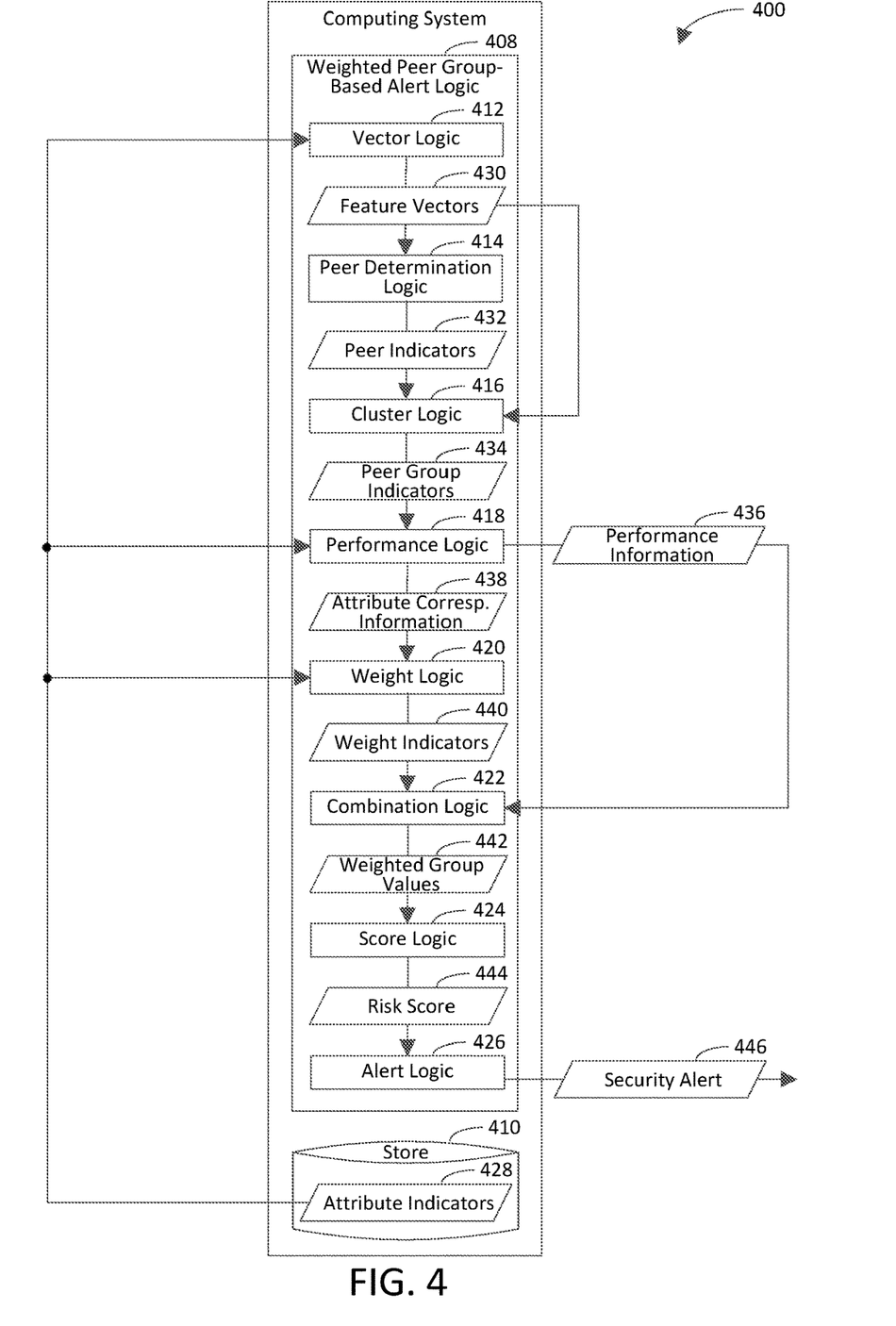
FIG. 4 is a block diagram of an example computing system in accordance with an embodiment.

FIGS. 2-3 depict flowcharts 200 and 300 of example methods for using weighted peer groups to selectively trigger a security alert in accordance with embodiments. Flowcharts 200 and 300 may be performed by the first server(s) 106A, shown in FIG. 1, for example. For illustrative purposes, flowcharts 200 and 300 are described with respect to computing system 400 shown in FIG. 4, which is an example implementation of the first server(s) 106A. As shown in FIG. 4, the computing system 400 includes weighted peer group-based alert logic 408 and a store 410. The weighted peer group-based alert logic 408 includes vector logic 412, peer determination logic 414, cluster logic 416, performance logic 418, weight logic 420, combination logic 422, score logic 424, and alert logic 426. The store 410 may be any suitable type of store. One type of store is a database. For instance, the store 410 may be a relational database, an entity-relationship database, an object database, an object relational database, an extensible markup language (XML) database, etc. The store 410 is shown to store attribute indicators 428 for non-limiting illustrative purposes. Further structural and operational embodiments will be apparent to persons skilled in the relevant art(s) based on the discussion regarding flowcharts 200 and 300.

As shown in FIG. 2, the method of flowchart 200 begins at step 202. In step 202, a determination is made that an entity performs an operation. Examples of an entity include but are not limited to a user, a device (e.g., a server), an application, data (e.g., a file), and anything with an Internet protocol (IP) address. Examples of an operation include but are not limited to logging on to a server; accessing an application; accessing, deleting, or writing to a file; accessing, deleting, or writing to a folder; and otherwise using a resource. For instance, the operation may include a first instance in which the entity performs any of these example activities. The entity has peers that are categorized among multiple peer groups. Each peer of the entity has a relationship with the entity. Each peer group includes a respective subset of the peers. The peers in each subset have a respective type of relationship with the entity. Each type of relationship is characterized by the peers in the respective subset having one or more designated attributes in common with the entity. Peers that do not have at least a threshold similarity to the entity may be excluded from the peer groups, though the example embodiments are not limited in this respect. For instance, peers that do not have at least a threshold number of attributes in common with the entity may be excluded from the peer groups. A threshold against which a similarly between each peer and the entity is compared may change dynamically with time depending on any of a variety of factors (e.g., a number of the peers, an average or median number of attributes that each peer has).

Each of the peer groups may be any suitable type, including but not limited to an organizational peer group, a security peer group, a collaboration peer group, or a behavioral peer group. An organizational peer group is a peer group in which each peer has an organizational relationship with the entity. More particularly, each peer in the organizational peer group (A) is employed by a same organization as the entity, (B) is included in a same department or division of an organization as the entity, and/or (C) has a same title, manager, or role in an organization as the entity. A security peer group is a peer group in which each peer has a security relationship with the entity. More particularly, each peer in the security peer group has one or more identified security permissions in common with the entity. Examples of a security permission include but are not limited to a permission to access (e.g., read or use) a resource, a permission to edit the resource, a permission to delete the resource, and a permission to share the resource. A collaboration peer group is a peer group in which each peer has a collaboration relationship with the entity. More particularly, each peer in the security peer group shares a resource with the entity. A behavioral peer group is a peer group in which each peer has a behavioral relationship with the entity. More particularly, each peer in the security peer group performs one or more same activities (e.g., accesses one or more same resources) as the entity.

In an example implementation, the performance logic 418 determines that the entity performs the operation. For example, the performance logic 418 may analyze attributes of the entity, which are indicated (e.g., specified) by the attribute indicators 428, to discover that the entity has performed the operation. In accordance with this example, the performance logic 418 may retrieve the attribute indicators 428 from the store 410 so that the attributes of the entity may be identified. It should be noted that the attribute indicators 428 indicate attributes of the entity and attributes of other entities, as well. Each of the other entities is either a peer of the entity or a non-peer of the entity. A non-peer of the entity is another entity that is not a peer of the entity. Each peer of the entity has a relationship with the entity; whereas, each non-peer of the entity does not have a relationship with the entity.

In an example embodiment, the peer groups of the entity change over time as the attributes of the entity and/or the attributes of the other entities change over time. For instance, at least one peer of the entity may become a non-peer of the entity, and/or at least one non-peer of the entity may become a peer of the entity, as a result of such changes. Accordingly, the peers in at least one of the peer groups may change over time, and a number of the peer groups may change over time.

At step 204, for each peer group, an extent to which the peers in the peer group perform the operation is determined.

In an example implementation, for each peer group, the performance logic 418 determines the extent to which the peers in the peer group perform the operation. For instance, the performance logic 418 may review peer group indicators 434 to determine the peer groups and to determine which of the peers are included in each peer group. For example, each of the peer group indicators 434 may correspond to a respective peer of the entity and may indicate to which peer group(s) the peer belongs. In another example, each of the peer group indicators 434 may correspond to a respective peer group and may indicate which of the peers of the entity belong to the peer group. By reviewing the peer group indicators 434, the performance logic 418 may cross-reference each peer with the peer group(s) to which the peer belongs and/or cross-reference each peer group with the peers that belong to the peer group.

The performance logic 418 may analyze the attributes of the peers, which are indicated by the attribute indicators 428, to determine which of the peers have performed the operation, a number of times that each peer has performed the operation, a frequency with which each peer has performed the operation, and so on. The performance logic 418 may retrieve the attribute indicators 428 from the store 410 so that the attributes of the peers may be identified. The attribute indicators 428 may be updated in real-time as the attributes of the entity and the attributes of the peers change over time. The performance logic 418 may retrieve the attribute indicators 428 periodically or in real-time as the attribute indicators 428 are updated to determine which operations have been performed by the entity and which operations have been performed by each of the peers.

Accordingly, by analyzing the peer group indicators 434 in combination with the attribute indicators 428, the performance logic 418 may determine the extent to which the peers in each peer group perform the operation. The performance logic 418 may generate performance information 436 to indicate, for each peer group, the extent to which the peers in the peer group perform the operation.

The performance logic 418 may compare the attributes of the entity to the attributes of each peer of the entity by analyzing the attribute indicators 428 to provide comparison information regarding the peer. The comparison information regarding each peer indicates an extent to which the attributes of the entity correspond to the attributes of the peer. As mentioned above, the performance logic 418 may analyze the peer group indicators 434 to determine which of the peers is included in each of the peer groups. Accordingly, by analyzing the attribute indicators 428 and the peer group indicators 434, the performance logic 418 may determine an extent to which the attributes of the entity correspond to the attributes of the peers in each peer group. For instance, the performance logic 418 may combine the comparison information for the peers in each peer group to determine an extent to which the attributes of the entity correspond to the attributes of the peers in the respective peer group. The performance logic 418 may generate attribute correspondence information 438 to indicate, for each peer group, the extent to which the attributes of the entity correspond to the attributes of the peers in the peer group.

At step 206, weights are assigned to the respective peer groups. Each weight indicates an extent to which attributes of the entity correspond to attributes of the peers in the respective peer group. For example, each weight may indicate (e.g., may be directly proportional to) an extent to which the attributes of the entity match (e.g., overlap or are same as) the attributes of the peers in the respective peer group. In another example, each weight may be inversely proportional to a difference between the attributes of the entity and the attributes of the peers in the respective peer group. The weights that are assigned to the respective peer groups may be further based at least in part on other factor(s), including but not limited to respective sizes of the respective peer groups. For instance, a relatively smaller size of a peer group may cause the weight of the peer group to be relatively higher, and a relatively larger size of a peer group may cause the weight of the peer group to be relatively lower. The weights of the peer groups may be normalized weights, though the example embodiments are not limited in this respect. The extent to which the attributes of the entity correspond to the attributes of the peers in each peer group may be based at least in part on how many of the attributes of the entity correspond to the attributes of the peers in the respective peer group and/or how closely those corresponding (e.g., similar) attributes correspond (e.g., match).

In an example implementation, the weight logic 420 assigns the weights to the respective peer groups. For instance, the weight logic 420 may analyze the attribute correspondence information 438 to determine, for each peer group, the extent to which the attributes of the entity correspond to the attributes of the peers in the peer group. The weight logic 420 may establish (e.g., select) each weight based on (e.g., based at least in part on) the extent to which the attributes of the entity correspond to the attributes of the peers in the peer group to which the weight is to be assigned, as indicated by the attribute correspondence information 438. The weight logic 420 may generate weight indicators 440 to indicate the weights that are assigned to the respective peer groups. For instance, the weight indicators 440 may cross-reference the weights to the respective peer groups.

At step 208, for each peer group, the extent to which the peers in the peer group perform the operation and the weight that is assigned to the peer group are combined to provide a respective weighted group value. In an example implementation, for each peer group, the combination logic 422 combines the extent to which the peers in the peer group perform the operation and the weight that is assigned to the peer group to provide the respective weighted group value. Accordingly, the combination logic 422 generates the weighted group values 442 for the respective peer groups. For instance, the combination logic 422 may analyze the performance information 436 to determine the extent to which the peers in each peer group perform the operation. The combination logic 422 may analyze the weight indicators 440 to determine the weights that are assigned to the respective peer groups.

At step 210, a risk score, which is based at least in part on the weighted group values of the peer groups, is assigned to the operation. The risk score may be further based at least in part on other factor(s), including but not limited to a number of peer groups of the entity. For instance, fewer peer groups may weigh in favor of a relatively lower risk score, and more peer groups may weigh in favor of a relatively higher risk score. In an example implementation, the score logic 424 assigns a risk score 444 to the operation. In accordance with this implementation, the risk score 444 is based at least in part on the weighted group values 442 of the respective peer groups.

At step 212, the security alert regarding the operation is selectively triggered (e.g., initiated) based at least in part on the risk score. The security alert may be configured to notify a security analyst (e.g., an IT professional) that the entity has performed an anomalous operation, though the example embodiments are not limited in this respect. In an example implementation, the alert logic 426 selectively triggers the security alert 446 regarding the operation based at least in part on the risk score 444. For example, the alert logic 426 may trigger the security alert 446 based at least in part on the risk score being greater than or equal to a score threshold. In another example, the alert logic 426 may not trigger the security alert 446 based at least in part on the risk score being less than the score threshold.

In an example embodiment, the weight that is assigned to each peer group at step 206 is inversely proportional to an average of a difference between a representation of the attributes of the entity and a representation of the attributes of the peers in the peer group. In accordance with this embodiment, for each peer group, combining the extent to which the peers in the peer group perform the operation and the weight that is assigned to the peer group at step 208 includes, for each peer group, dividing the weight that is assigned to the peer group by the extent to which the peers in the peer group perform the operation to provide the respective weighted group value. For instance, a relatively higher weighted group value may increase the risk score to a relatively greater extent, and a relatively lower weighted group value may increase the risk score to a relatively lesser extent. In accordance with this embodiment, the risk score that is assigned to the operation at step 210 may be based at least in part on a sum of the weighted group values of the respective peer groups.

In some example embodiments, one or more steps 202, 204, 206, 208, 210, and/or 212 of flowchart 200 may not be performed. Moreover, steps in addition to or in lieu of steps 202, 204, 206, 208, 210, and/or 212 may be performed. For instance, in an example feature vector embodiment, the method of flowchart 200 may include one or more of the steps shown in flowchart 300 of FIG. 3. As shown in FIG. 3, the method of flowchart 300 begins at step 302. In step 302, a feature vector is generated to represent the entity. The feature vector of the entity is based on behavioral attribute(s) of the entity and/or static attribute(s) of the entity. A behavioral attribute of an entity indicates a behavior that is exhibited by the entity. For instance, the behavioral attribute may indicate performance of an operation by the entity. For example, performance of the operation may include collaborating with peer(s) of the entity. Collaborating with the peer(s) may include sharing a resource with the peer(s), communicating with the peer(s) regarding a project on which the entity and the peer(s) are working, and so on. In another example, performance of the operation may include accessing (e.g., reading or using) a resource, editing a resource, or deleting a resource. A static attribute of an entity is an attribute of the entity that is relatively static. For instance, the static attribute may indicate an employer of the entity; a department or division in which the entity works; a title, manager, or role of the entity in an organization; or a security permission of the entity. In an example implementation, vector logic 412 generates the feature vector to represent the entity. In accordance with this implementation, the vector logic 412 may generate the feature vectors 430 to include the feature vector that represents the entity.

At step 304, feature vectors are generated to represent the respective peers. The feature vector of each peer is based on behavioral attribute(s) of the peer and/or static attribute(s) of the peer. A behavioral attribute of a peer indicates a behavior that is exhibited by the peer. For instance, the behavioral attribute may indicate performance of an operation by the peer. For example, performance of the operation may include collaborating with the entity or another peer. Collaborating with the entity or another peer may include sharing a resource with the entity or the other peer, communicating with the entity or the other peer regarding a project on which the peer is working with the entity or the other peer, and so on. In another example, performance of the operation may include accessing (e.g., reading or using) a resource, editing a resource, or deleting a resource. A static attribute of a peer is an attribute of the peer that is relatively static. For instance, the static attribute may indicate an employer of the peer; a department or division in which the peer works; a title, manager, or role of the peer in an organization; or a security permission of the peer. In an example implementation, vector logic 412 generates the feature vectors to represent the respective peers. In accordance with this implementation, the vector logic 412 may generate the feature vectors 430 to include the feature vectors that represent the respective peers.

In accordance with the feature vector embodiment, the weight that is assigned to each peer group corresponds to a difference between the feature vector of the entity and a combination of the feature vectors of the peers in the peer group. For example, the weight that is assigned to each peer group may be inversely proportional to a difference between the feature vector of the entity and the combination of the feature vectors of the peers in the peer group. For instance, the combination of the feature vectors of the peers in each peer group may be an average of the feature vectors of the peers in the peer group or a median of the feature vectors of the peers in the peer group.

At step 306, the feature vectors that represent the respective peers are clustered among the peer groups using a clustering algorithm based at least in part on the types of relationships between the peers and the entity that are indicated by the feature vectors that represent the respective peers. In an example, the clustering algorithm may be a non-parametric clustering algorithm. In another example, the clustering algorithm may be a density-based clustering algorithm. One example type of a clustering algorithm that may be used to cluster the feature vectors is a density-based spatial clustering of applications with noise (DBSCAN) algorithm. The feature vectors may be clustered periodically, though the example embodiments are not limited in this respect. For instance, by clustering the feature vectors periodically, clustering of the feature vectors among the peer groups may be performed more accurately and/or precisely. In an example implementation, the cluster logic 416 clusters the feature vectors that represent the respective peers among the peer groups using the clustering algorithm. For instance, the cluster logic 416 may identify the peers of the entity based on peer indicators 432, which indicate the peers. The cluster logic 416 may compare the feature vector of the entity to the feature vectors of the respective peers to identify type(s) of relationship(s) between the entity and each peer. By identifying the type(s) of the relationship(s) between the entity and each peer, the cluster logic 416 may determine which subsets of the peers have respective types of relationships with the entity. The cluster logic 416 may cluster the subsets into the respective peer groups based on the subsets having the respective types of the relationships with the entity.

It should be noted that in the feature vector embodiment, the vector logic 412 may generate feature vectors 430 to include feature vectors that represent respective non-peers of the entity in addition to the feature vector that represents the entity and the feature vectors that represent the respective peers of the entity. For instance, the vector logic 412 may generate feature vectors for all entities that have attributes indicated by the attribute indicators 428, including the entity, the peers of the entity, and the non-peers of the entity. In accordance with the feature vector embodiment, the peer determination logic 414 analyzes the feature vectors 430 to determine the peers of the entity. For instance, the vector logic 412 may compare the feature vector of the entity with the feature vectors of the other entities to identify which of the other entities are peers of the entity.

In an example, the peer determination logic 414 may determine that each of the other entities that is represented by a feature vector that includes at least one feature in common with the feature vector of the entity is a peer of the entity. In accordance with this example, the peer determination logic 414 may determine that each of the other entities that is represented by a feature vector that does not include at least one feature in common with the feature vector of the entity is a non-peer of the entity.

In another example, the peer determination logic 414 may determine that each of the other entities that is represented by a feature vector that includes a number of features in common with the feature vector of the entity that is greater than or equal to a threshold number is a peer of the entity. In accordance with this example, the peer determination logic 414 may determine that each of the other entities that is represented by a feature vector that includes a number of features in common with the feature vector of the entity that is less than the threshold number is a non-peer of the entity.

In yet an example, the peer determination logic 414 may determine that each of the other entities that is represented by a feature vector that includes at least one specified type of feature in common with the feature vector of the entity is a peer of the entity. In accordance with this example, the peer determination logic 414 may determine that each of the other entities that is represented by a feature vector that does not include at least one specified type of feature in common with the feature vector of the entity is a non-peer of the entity.

The peer determination logic 414 may generate the peer indicators 432 to indicate the peers of the entity.

The peer determination logic 414 is capable of determining the peers of the entity even in absence of the feature vectors 430. For example, the peer determination logic 414 may determine the peers of the entity by comparing the attributes of the entity to the attributes of other entities, which are indicated by the attribute indicators 428. The peer determination logic 414 may determine whether each of the other entities is a peer of the entity based on whether the comparison indicates that a relationship exists between the entity and the other entity. If a relationship exists between the entity and the other entity, the other entity is a peer of the entity. If a relationship does not exist between the entity and the other entity, the other entity is not a peer of the entity. For instance, the relationship between the entity and each peer may be characterized (e.g., defined) by the entity and the peer having at least one attribute in common. For example, the relationship between the entity and each peer may be characterized by the entity and the peer having a number of attributes in common that is greater than or equal to a threshold number. In another example, the relationship between the entity and each peer may be characterized by the entity and the peer having at least one specified type of attribute in common.

It will be recognized that the computing system 400 may not include one or more of the weighted peer group-based alert logic 408, the store 410, the vector logic 412, the peer determination logic 414, the cluster logic 416, the performance logic 418, the weight logic 420, the combination logic 422, the score logic 424, and/or the alert logic 426.

Furthermore, the computing system 400 may include components in addition to or in lieu of the weighted peer group-based alert logic 408, the store 410, the vector logic 412, the peer determination logic 414, the cluster logic 416, the performance logic 418, the weight logic 420, the combination logic 422, the score logic 424, and/or the alert logic 426.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the weighted peer group-based alert logic 108, the weighted peer group-based alert logic 408, the vector logic 412, the peer determination logic 414, the cluster logic 416, the performance logic 418, the weight logic 420, the combination logic 422, the score logic 424, the alert logic 426, flowchart 200, and/or flowchart 300 may be implemented in hardware, software, firmware, or any combination thereof.

For example, any one or more of the weighted peer group-based alert logic 108, the weighted peer group-based alert logic 408, the vector logic 412, the peer determination logic 414, the cluster logic 416, the performance logic 418, the weight logic 420, the combination logic 422, the score logic 424, the alert logic 426, flowchart 200, and/or flowchart 300 may be implemented, at least in part, as computer program code configured to be executed in one or more processors.

In another example, any one or more of the weighted peer group-based alert logic 108, the weighted peer group-based alert logic 408, the vector logic 412, the peer determination logic 414, the cluster logic 416, the performance logic 418, the weight logic 420, the combination logic 422, the score logic 424, the alert logic 426, flowchart 200, and/or flowchart 300 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 5:
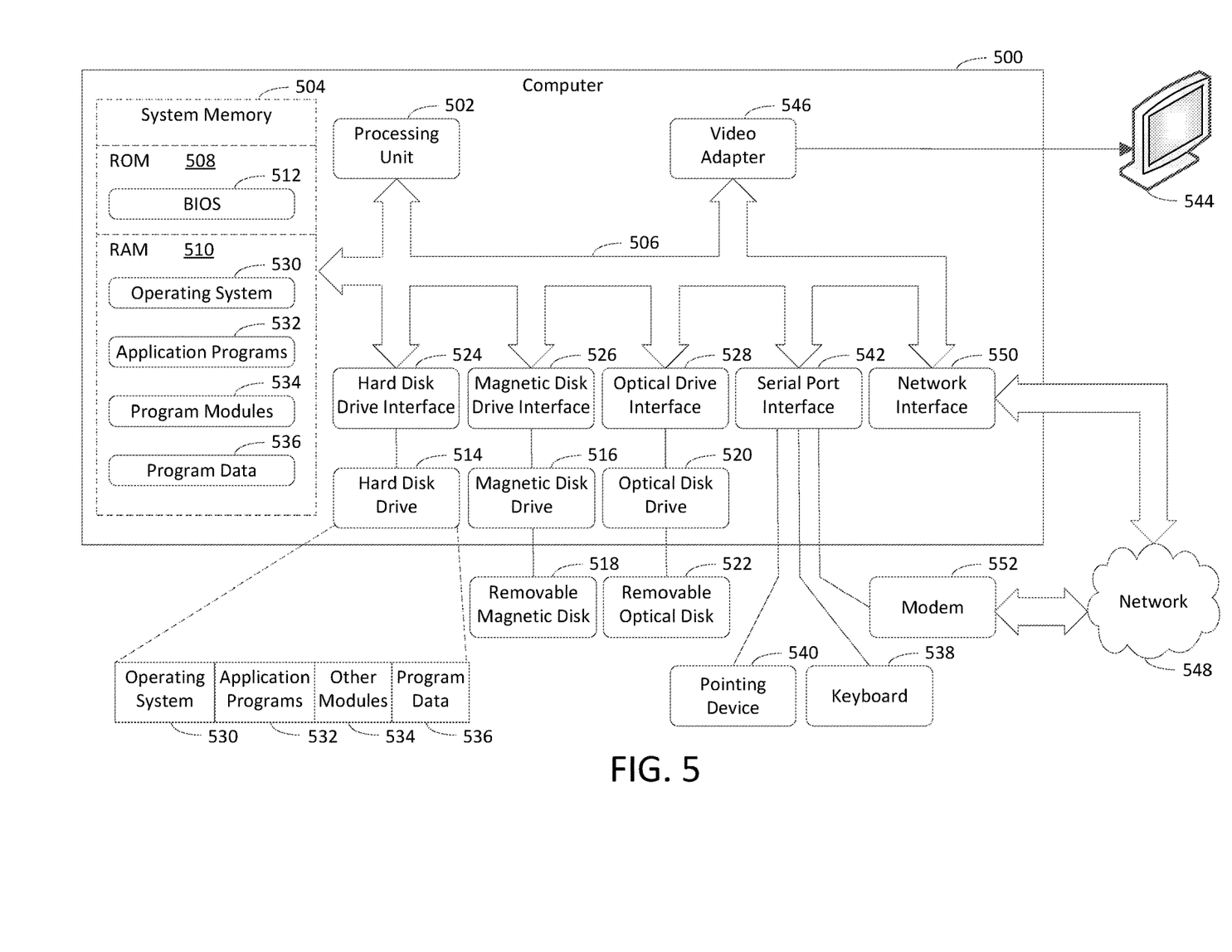
FIG. 5 depicts an example computer in which embodiments may be implemented.

III. Further Discussion of Some Example Embodiments (A1) An example system (FIG. 1, 102A-102M or 106A-106N; FIG. 4, 400; FIG. 5, 500) to use weighted peer groups to selectively trigger a security alert (FIG. 4, 446) comprises a memory (FIG. 5, 504, 508, 510) and one or more processors (FIG. 5, 502) coupled to the memory. The one or more processors are configured to determine (FIG. 2, 202) that an entity performs an operation, the entity having a plurality of peers that are categorized among a plurality of peer groups, each peer of the entity having a relationship with the entity, each peer group including a respective subset of the peers, the peers in each subset having a respective type of relationship with the entity. The one or more processors are further configured to, for each peer group in the plurality of peer groups, determine (FIG. 2, 204) an extent to which the peers in the peer group perform the operation. The one or more processors are further configured to assign (FIG. 2, 206) a plurality of weights to the plurality of respective peer groups, each weight indicating an extent to which attributes of the entity correspond to attributes of the peers in the respective peer group. The one or more processors are further configured to, for each peer group in the plurality of peer groups, combine (FIG. 2, 208) the extent to which the peers in the peer group perform the operation and the weight that is assigned to the peer group to provide a respective weighted group value. The one or more processors are further configured to assign (FIG. 2, 210) a risk score (FIG. 4, 444), which is based at least in part on the weighted group values of the peer groups, to the operation. The one or more processors are further configured to selectively trigger (FIG. 2, 212) the security alert regarding the operation based at least in part on the risk score.

(A2) In the example system of A1, wherein the plurality of peer groups includes an organizational peer group, which is defined such that each peer in the organizational peer group at least one of: is employed by a same organization as the entity, is included in a same department or division of an organization as the entity, or has a same title, manager, or role in an organization as the entity.

(A3) In the example system of any of A1-A2, wherein the plurality of peer groups includes a security peer group, which is defined such that each peer in the security peer group has one or more identified security permissions in common with the entity.

(A4) In the example system of any of A1-A3, wherein the plurality of peer groups includes a collaboration peer group, which is defined such that each peer in the collaboration peer group shares a resource with the entity.

(A5) In the example system of any of A1-A4, wherein the plurality of peer groups includes a behavioral peer group, which is defined such that each peer in the behavioral peer group performs one or more same activities as the entity.

(A6) In the example system of any of A1-A5, wherein the one or more processors are further configured to generate a feature vector to represent the entity. The feature vector of the entity is based on at least one of one or more behavioral attributes of the entity or one or more static attributes of the entity. The one or more processors are further configured to generate feature vectors to represent the respective peers. The feature vector of each peer is based on at least one of one or more behavioral attributes of the peer or one or more static attributes of the peer. The weight that is assigned to each peer group corresponds to a difference between the feature vector of the entity and a combination of the feature vectors of the peers in the peer group.

(A7) In the example system of any of A1-A6, wherein the one or more processors are further configured to cluster the feature vectors that represent the respective peers among the plurality of peer groups using a clustering algorithm based at least in part on the types of relationships between the peers and the entity that are indicated by the feature vectors that represent the respective peers.

(A8) In the example system of any of A1-A7, wherein the plurality of peer groups is configured to change over time based at least in part on the attributes of the entity changing over time.

(A9) In the example system of any of A1-A8, wherein the weight that is assigned to each peer group is inversely proportional to an average of a difference between a representation of the attributes of the entity and a representation of the attributes of the peers in the peer group. The one or more processors are configured to, for each peer group, divide the weight that is assigned to the peer group by the extent to which the peers in the peer group perform the operation to provide the respective weighted group value.

(A10) In the example system of any of A1-A9, wherein the risk score that is assigned to the operation is based at least in part on a sum of the weighted group values of the respective peer groups.

(A11) In the example system of any of A1-A10, wherein the weights that are assigned to the respective peer groups are based at least in part on respective sizes of the respective peer groups.

(A12) In the example system of any of A1-A11, wherein the risk score that is assigned to the operation is further based at least in part on a number of peer groups of the entity.

(B1) An example method of using weighted peer groups to selectively trigger a security alert (FIG. 4, 446), the method implemented by a computing system (FIG. 1, 102A-102M or 106A-106N; FIG. 4, 400; FIG. 5, 500), comprises determining (FIG. 2, 202) that an entity performs an operation, the entity having a plurality of peers that are categorized among a plurality of peer groups. Each peer of the entity has a relationship with the entity. Each peer group includes a respective subset of the peers. The peers in each subset have a respective type of relationship with the entity. The method further comprises, for each peer group in the plurality of peer groups, determining (FIG. 2, 204) an extent to which the peers in the peer group perform the operation. The method further comprises assigning (FIG. 2, 206) a plurality of weights to the plurality of respective peer groups. Each weight indicates an extent to which attributes of the entity correspond to attributes of the peers in the respective peer group. The method further comprises, for each peer group in the plurality of peer groups, combining (FIG. 2, 208) the extent to which the peers in the peer group perform the operation and the weight that is assigned to the peer group to provide a respective weighted group value. The method further comprises assigning (FIG. 2, 210) a risk score (FIG. 4, 444), which is based at least in part on the weighted group values of the peer groups, to the operation. The method further comprises selectively triggering (FIG. 2, 212) the security alert regarding the operation based at least in part on the risk score.

(B2) In the method of B1, wherein the plurality of peer groups includes an organizational peer group, which is defined such that each peer in the organizational peer group at least one of: is employed by a same organization as the entity, is included in a same department or division of an organization as the entity, or has a same title, manager, or role in an organization as the entity.

(B3) In the method of any of B1-B2, wherein the plurality of peer groups includes a security peer group, which is defined such that each peer in the security peer group has one or more identified security permissions in common with the entity.

(B4) In the method of any of B1-B3, wherein the plurality of peer groups includes a collaboration peer group, which is defined such that each peer in the collaboration peer group shares a resource with the entity.

(B5) In the method of any of B1-B4, wherein the plurality of peer groups includes a behavioral peer group, which is defined such that each peer in the behavioral peer group performs one or more same activities as the entity.

(B6) In the method of any of B1-B5, further comprising generating a feature vector to represent the entity. The feature vector of the entity is based on at least one of one or more behavioral attributes of the entity or one or more static attributes of the entity. The method further comprises generating feature vectors to represent the respective peers. The feature vector of each peer is based on at least one of one or more behavioral attributes of the peer or one or more static attributes of the peer. The weight that is assigned to each peer group corresponds to a difference between the feature vector of the entity and a combination of the feature vectors of the peers in the peer group.

(B7) In the method of any of B1-B6, further comprising clustering the feature vectors that represent the respective peers among the plurality of peer groups using a clustering algorithm based at least in part on the types of relationships between the peers and the entity that are indicated by the feature vectors that represent the respective peers.

(B8) In the method of any of B1-B7, wherein the plurality of peer groups changes over time based at least in part on the attributes of the entity changing over time.

(B9) In the method of any of B1-B8, wherein the weight that is assigned to each peer group is inversely proportional to an average of a difference between a representation of the attributes of the entity and a representation of the attributes of the peers in the peer group. For each peer group in the plurality of peer groups, combining the extent to which the peers in the peer group perform the operation and the weight that is assigned to the peer group to provide a respective weighted group value comprises, for each peer group, dividing the weight that is assigned to the peer group by the extent to which the peers in the peer group perform the operation to provide the respective weighted group value.

(B10) In the method of any of B1-B9, wherein the risk score that is assigned to the operation is based at least in part on a sum of the weighted group values of the respective peer groups.

(B11) In the method of any of B1-B10, wherein the weights that are assigned to the respective peer groups are based at least in part on respective sizes of the respective peer groups.

(B12) In the method of any of B1-B11, wherein the risk score that is assigned to the operation is further based at least in part on a number of peer groups of the entity.

(C1) An example computer program product (FIG. 5, 518, 522) comprising a computer-readable storage medium having instructions recorded thereon for enabling a processor-based system (FIG. 1, 102A-102M or 106A-106N; FIG. 4, 400; FIG. 5, 500) to use weighted peer groups to selectively trigger a security alert (FIG. 4, 446) by performing operations, the operations comprising: determining (FIG. 2, 202) that an entity performs an operation, the entity having a plurality of peers that are categorized among a plurality of peer groups, each peer of the entity having a relationship with the entity, each peer group including a respective subset of the peers, the peers in each subset having a respective type of relationship with the entity; for each peer group in the plurality of peer groups, determining (FIG. 2, 204) an extent to which the peers in the peer group perform the operation; assigning (FIG. 2, 206) a plurality of weights to the plurality of respective peer groups, each weight indicating an extent to which attributes of the entity correspond to attributes of the peers in the respective peer group; for each peer group in the plurality of peer groups, combining (FIG. 2, 208) the extent to which the peers in the peer group perform the operation and the weight that is assigned to the peer group to provide a respective weighted group value; assigning (FIG. 2, 210) a risk score (FIG. 4, 444), which is based at least in part on the weighted group values of the peer groups, to the operation; and selectively triggering (FIG. 2, 212) the security alert regarding the operation based at least in part on the risk score.

IV. Example Computer System

FIG. 5 depicts an example computer 500 in which embodiments may be implemented. Any one or more of the user devices 102A-102M and/or any one or more of the servers 106A-106N shown in FIG. 1 and/or computing system 400 shown in FIG. 4 may be implemented using computer 500, including one or more features of computer 500 and/or alternative features. Computer 500 may be a general-purpose computing device in the form of a conventional personal computer, a mobile computer, or a workstation, for example, or computer 500 may be a special purpose computing device. The description of computer 500 provided herein is provided for purposes of illustration, and is not intended to be limiting. Embodiments may be implemented in further types of computer systems, as would be known to persons skilled in the relevant art(s).

As shown in FIG. 5, computer 500 includes a processing unit 502, a system memory 504, and a bus 506 that couples various system components including system memory 504 to processing unit 502. Bus 506 represents one or more of any of several types of bus structures, including a memory bus or memory controller, a peripheral bus, an accelerated graphics port, and a processor or local bus using any of a variety of bus architectures. System memory 504 includes read only memory (ROM) 508 and random access memory (RAM) 510. A basic input/output system 512 (BIOS) is stored in ROM 508.

Computer 500 also has one or more of the following drives: a hard disk drive 514 for reading from and writing to a hard disk, a magnetic disk drive 516 for reading from or writing to a removable magnetic disk 518, and an optical disk drive 520 for reading from or writing to a removable optical disk 522 such as a CD ROM, DVD ROM, or other optical media. Hard disk drive 514, magnetic disk drive 516, and optical disk drive 520 are connected to bus 506 by a hard disk drive interface 524, a magnetic disk drive interface 526, and an optical drive interface 528, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 530, one or more application programs 532, other program modules 534, and program data 536. Application programs 532 or program modules 534 may include, for example, computer program logic for implementing any one or more of (e.g., at least a portion of) the weighted peer group-based alert logic 108, the weighted peer group-based alert logic 408, the vector logic 412, the peer determination logic 414, the cluster logic 416, the performance logic 418, the weight logic 420, the combination logic 422, the score logic 424, the alert logic 426, flowchart 200 (including any step of flowchart 200), and/or flowchart 300 (including any step of flowchart 300), as described herein.

A user may enter commands and information into the computer 500 through input devices such as keyboard 538 and pointing device 540. Other input devices (not shown) may include a microphone, joystick, game pad, satellite dish, scanner, touch screen, camera, accelerometer, gyroscope, or the like. These and other input devices are often connected to the processing unit 502 through a serial port interface 542 that is coupled to bus 506, but may be connected by other interfaces, such as a parallel port, game port, or a universal serial bus (USB).

A display device 544 (e.g., a monitor) is also connected to bus 506 via an interface, such as a video adapter 546. In addition to display device 544, computer 500 may include other peripheral output devices (not shown) such as speakers and printers.

Computer 500 is connected to a network 548 (e.g., the Internet) through a network interface or adapter 550, a modem 552, or other means for establishing communications over the network. Modem 552, which may be internal or external, is connected to bus 506 via serial port interface 542.

As used herein, the terms "computer program medium" and "computer-readable storage medium" are used to generally refer to media (e.g., non-transitory media) such as the hard disk associated with hard disk drive 514, removable magnetic disk 518, removable optical disk 522, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 532 and other program modules 534) may be stored on the hard disk, magnetic disk, optical disk, ROM, or RAM. Such computer programs may also be received via network interface 550 or serial port interface 542. Such computer programs, when executed or loaded by an application, enable computer 500 to implement features of embodiments discussed herein. Accordingly, such computer programs represent controllers of the computer 500.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:
a memory; and
a processing system coupled to the memory, the processing system configured to:
 determine that an entity performs an operation, the operation comprising an attempt to access a resource;
 obtain a feature vector to represent the entity, wherein the feature vector of the entity is based on at least one of a behavioral attribute of the entity or a static attribute of the entity;
 obtain feature vectors to represent respective peers of a plurality of peers of the entity, wherein the feature vectors of the respective peers are based on at least one of the following: behavioral attributes of the respective peers or static attributes of the respective peers;
 cluster the plurality of peers of the entity into a plurality of peer groups, which comprise subsets of the plurality of peers, using a non-parametric or density-based clustering algorithm by providing information indicating types of relationships, comprising a collaboration relationship, between the peers and the entity from the feature vector of the entity and the feature vectors of the respective peers as input to the non-parametric or density-based clustering algorithm, which causes the non-parametric or density-based clustering algorithm to define the plurality of peer groups, comprising a collaboration peer group, based at least in part on peers in the subsets having respective types of relationships with the entity and further based at least in part on the peers in the subsets having a number of features in common with the entity that is greater than or equal to a threshold number, the collaboration peer group defined by the subset of the peers in the collaboration peer group and the entity having the collaboration relationship by sharing a file, a folder, or a message;
 determine a plurality of extents to which the peers in the plurality of peer groups perform the operation;
 assign a plurality of weights to the plurality of peer groups, the plurality of weights indicating a plurality of extents to which attributes of the entity, as indicated by the feature vector of the entity, correspond to attributes of the peers in the plurality of peer groups, as indicated by a plurality of combinations of the feature vectors corresponding to the plurality of peer groups, wherein the weights that are assigned to the peer groups are based at least in part on respective sizes of the peer groups, wherein a size of a peer group being smaller corresponds to the weight of the peer group being higher, and wherein the size of the peer group being larger corresponds to the weight of the peer group being lower;

combine the plurality of extents to which the peers in the plurality of peer groups perform the operation and the plurality of weights that are assigned to the plurality of peer groups to provide a plurality of weighted group values;

assign a risk score, which is based at least in part on the weighted group values of the peer groups, to the operation; and based at least in part on the risk score being greater than or equal to a score threshold, perform a remedial action with regard to the operation by preventing the entity from accessing the resource.

2. The system of claim 1, wherein the plurality of peer groups further comprises an organizational peer group, which is defined such that each peer in the organizational peer group has a same manager as the entity.

3. The system of claim 1, wherein the plurality of peer groups further comprises a security peer group, which is defined such that each peer in the security peer group has an identified security permission in common with the entity.

4. The system of claim 1, wherein the plurality of peer groups further comprises a behavioral peer group, which is defined such that each peer in the behavioral peer group performs a same activity as the entity.

5. The system of claim 1, wherein the plurality of peer groups is configured to change over time based at least in part on the attributes of the entity changing over time.

6. The system of claim 1, wherein the weight that is assigned to a peer group is inversely proportional to an average of a difference between a representation of the attributes of the entity and a representation of the attributes of the peers in the peer group; and wherein the processing system is configured to:
divide the weight that is assigned to the peer group by the extent to which the peers in the peer group perform the operation to provide the respective weighted group value.

7. The system of claim 6, wherein the risk score that is assigned to the operation is based at least in part on a sum of the weighted group values of the peer groups.

8. The system of claim 1, wherein the risk score that is assigned to the operation is further based at least in part on a number of peer groups of the entity;

wherein fewer peer groups weights in favor of a lower risk score; and wherein more peer groups weigh in favor of a higher risk score.

9. The system of claim 1, wherein the threshold number changes dynamically with time depending on at least one of the following:

a number of peers that are included in the plurality of peers;

an average number of attributes per peer in the plurality of peers; or a median number of attributes per peer in the plurality of peers.

10. A method implemented by a computing system, the method comprising:

determining that an entity performs an operation, the operation comprising an attempt to access a resource;

obtaining a feature vector to represent the entity, wherein the feature vector of the entity is based on at least one of a behavioral attribute of the entity or a static attribute of the entity;

obtaining feature vectors to represent respective peers of a plurality of peers of the entity, wherein the feature vectors of the respective peers are based on at least one of the following: behavioral attributes of the respective peers or static attributes of the respective peers;

clustering the plurality of peers of the entity into a plurality of peer groups, which comprise subsets of the plurality of peers, using a non-parametric or density-based clustering algorithm by providing information indicating types of relationships, which comprise a collaboration relationship, between the peers and the entity from the feature vector of the entity and the feature vectors of the respective peers as input to the non-parametric or density-based clustering algorithm, which causes the non-parametric or density-based clustering algorithm to define the plurality of peer groups, which comprise a collaboration peer group, based at least in part on peers in the subsets having respective types of relationships with the entity and further based at least in part on the peers in the subsets having a number of features in common with the entity that is greater than or equal to a threshold number, the collaboration peer group defined by a first subset of the plurality of peers having the collaboration relationship with the entity by sharing a file, a folder, or a message with the entity;

determining a plurality of extents to which the peers in the plurality of peer groups perform the operation;

assigning a plurality of weights to the plurality of peer groups, the plurality of weights indicating a plurality of extents to which attributes of the entity, as indicated by the feature vector of the entity, correspond to attributes of the peers in the plurality of peer groups, as indicated by a plurality of combinations of the feature vectors corresponding to the plurality of peer groups;

combining the plurality of extents to which the peers in the plurality of peer groups perform the operation and the plurality of weights that are assigned to the plurality of peer groups to provide a plurality of weighted group values;

assigning a risk score to the operation, wherein the risk score is based at least in part on the weighted group values of the peer groups and is further based at least in part on a number of peer groups of the entity, wherein fewer peer groups weighs in favor of a lower risk score, and wherein more peer groups weighs in favor of a higher risk score; and based at least in part on the risk score being greater than or equal to a score threshold, performing a remedial action with regard to the operation by preventing the entity from accessing the resource.

11. The method of claim 10, wherein the plurality of peer groups changes over time based at least in part on the attributes of the entity changing over time.

12. The method of claim 10, wherein the weight that is assigned to a peer group is inversely proportional to an average of a difference between a representation of the attributes of the entity and a representation of the attributes of the peers in the peer group; and wherein, for each peer group in the plurality of peer groups, combining the extent to which the peers in the peer group perform the operation and the weight that is assigned to the peer group to provide a respective weighted group value comprises:
dividing the weight that is assigned to the peer group by the extent to which the peers in the peer group perform the operation to provide the respective weighted group value.

13. The method of claim 10, wherein the weights that are assigned to the peer groups are based at least in part on respective sizes of the peer groups;
wherein a smaller size of a peer group causes the weight of the peer group to be higher; and
wherein a larger size of a peer group causes the weight of the peer group to be lower.

14. The method of claim 10, wherein the organizational peer group defined by the subset of the peers in the organizational peer group and the entity have a same manager.

15. A computer program product comprising a computer-readable storage medium having instructions recorded thereon for enabling a processor-based system to perform operations, the operations comprising:
determining that an entity performs an operation, the operation comprising an attempt to access a resource;
obtaining a feature vector to represent the entity, wherein the feature vector of the entity is based on at least one of a behavioral attribute of the entity or a static attribute of the entity;
obtaining feature vectors to represent respective peers of a plurality of peers of the entity, wherein the feature vectors of the respective peers are based on at least one of the following: behavioral attributes of the respective peers or static attributes of the respective peers;
clustering the plurality of peers of the entity into a plurality of peer groups, which comprise subsets of the plurality of peers, using a non-parametric or density-based clustering algorithm by providing information indicating types of relationships, comprising an organizational relationship, between the peers and the entity from the feature vector of the entity and the feature vectors of the respective peers as input to the non-parametric or density-based clustering algorithm, which causes the non-parametric or density-based clustering algorithm to define the plurality of peer groups, comprising an organizational peer group, based at least in part on peers in the subsets having respective types of relationships with the entity and further based at least in part on the peers in the subsets having a number of features in common with the entity that is greater than or equal to a threshold number;
determining a plurality of extents to which the peers in the plurality of peer groups perform the operation;
assigning a plurality of weights to the plurality of peer groups, the plurality of weights indicating a plurality of extents to which attributes of the entity, as indicated by the feature vector of the entity, correspond to attributes of the peers in the plurality of peer groups, as indicated by a plurality of combinations of the feature vectors corresponding to the plurality of peer groups;
combining the plurality of extents to which the peers in the plurality of peer groups perform the operation and the plurality of weights that are assigned to the plurality of peer groups to provide a plurality of weighted group values;
assigning a risk score, which is based at least in part on the weighted group values of the peer groups, to the operation; and
based at least in part on the risk score being greater than or equal to a score threshold, performing a remedial action with regard to the operation by preventing the entity from accessing the resource;
wherein at least one of the following:
the plurality of weights that are assigned to the plurality of peer groups are based at least in part on a plurality of respective sizes of the plurality of peer groups, wherein a smaller size of a peer group causes the weight of the peer group to be higher, and wherein a larger size of a peer group causes the weight of the peer group to be lower; or
the risk score that is assigned to the operation is further based at least in part on a number of peer groups of the entity, wherein fewer peer groups weights in favor of a lower risk score, and wherein more peer groups weigh in favor of a higher risk score.

16. The computer program product of claim 15, wherein the plurality of peer groups further comprises a collaboration peer group, which is defined by the subset of the peers in the collaboration peer group and the entity having the collaboration relationship by sharing at least one of a file or a folder.

17. The computer program product of claim 15, wherein the plurality of peer groups further comprises a security peer group, which is defined such that each peer in the security peer group has an identified security permission in common with the entity.

18. The computer program product of claim 15, wherein the plurality of peer groups further comprises a behavioral peer group, which is defined such that each peer in the behavioral peer group performs a same activity as the entity.

19. The computer program product of claim 15, wherein the plurality of weights that are assigned to the plurality of peer groups are based at least in part on the plurality of respective sizes of the plurality of peer groups.

20. The computer program product of claim 15, wherein the risk score that is assigned to the operation is further based at least in part on the number of peer groups of the entity.

* * * * *